United States Patent [19]

Courbot

[11] Patent Number: 4,527,670
[45] Date of Patent: Jul. 9, 1985

[54] DISC BRAKE

[75] Inventor: Pierre Courbot, Villiers le Bel, France

[73] Assignee: Societe Anonyme D.B.A., Paris, France

[21] Appl. No.: 679,102

[22] Filed: Dec. 7, 1984

Related U.S. Application Data

[63] Continuation of Ser. No. 446,073, Dec. 1, 1982, abandoned.

[30] Foreign Application Priority Data

Nov. 30, 1981 [FR] France ............................. 81 22348

[51] Int. Cl.³ .............................................. F16D 65/14
[52] U.S. Cl. ................................ 188/73.44; 188/73.34
[58] Field of Search ............... 188/73.34, 73.35, 73.41, 188/, 73.42, 73.43, 73.44, 73.45, 73.47

[56] References Cited

U.S. PATENT DOCUMENTS

| | | | |
|---|---|---|---|
| 2,784,811 | 3/1957 | Butler | 188/73.43 |
| 3,199,632 | 8/1965 | Chouings | 188/73.41 |
| 3,332,521 | 7/1967 | Burnett | 188/73.47 X |
| 3,433,328 | 3/1969 | Swift | 188/72.4 |
| 4,305,483 | 12/1981 | Ikeda | 188/73.45 X |

FOREIGN PATENT DOCUMENTS

| | | |
|---|---|---|
| 0030502 | 6/1981 | European Pat. Off. . |
| 0036368 | 9/1981 | European Pat. Off. . |
| 1284624 | 1/1962 | France . |
| 1309863 | 10/1962 | France . |
| 2093867 | 1/1972 | France . |
| 2283358 | 3/1976 | France . |
| 2338420 | 8/1977 | France . |
| 2422863 | 11/1979 | France . |
| 2444848 | 7/1980 | France . |

Primary Examiner—George E. A. Halvosa
Attorney, Agent, or Firm—Larry J. Palguta; Ken C. Decker

[57] ABSTRACT

A disc brake comprises a stirrup (10) mounted to slide on a fixed support (12) by way of a column (14) extending parallel to the axis (0) of the disc, the column (14) fixed to the fixed support (12) and received so as to slide in a corresponding bore (20) of the stirrup (10), and a locking element (50) associated with the stirrup (10) and with the fixed support (12) to cooperate in guiding the axial movements of the stirrup (10) relative to the fixed support and to oppose rotation of the stirrup (10) about the column (14) when the stirrup is in normal operating position. The locking element (50) is a rod having a first end (52) articulated to the stirrup (10) and a second end (54) articulated to the fixed support (12). The two ends (52, 54) of the rod have joints (56, 64) which provide the articulated connections and which allow the rod to move in a plane (Pb) perpendicular to the plane of the rotating disc.

3 Claims, 6 Drawing Figures

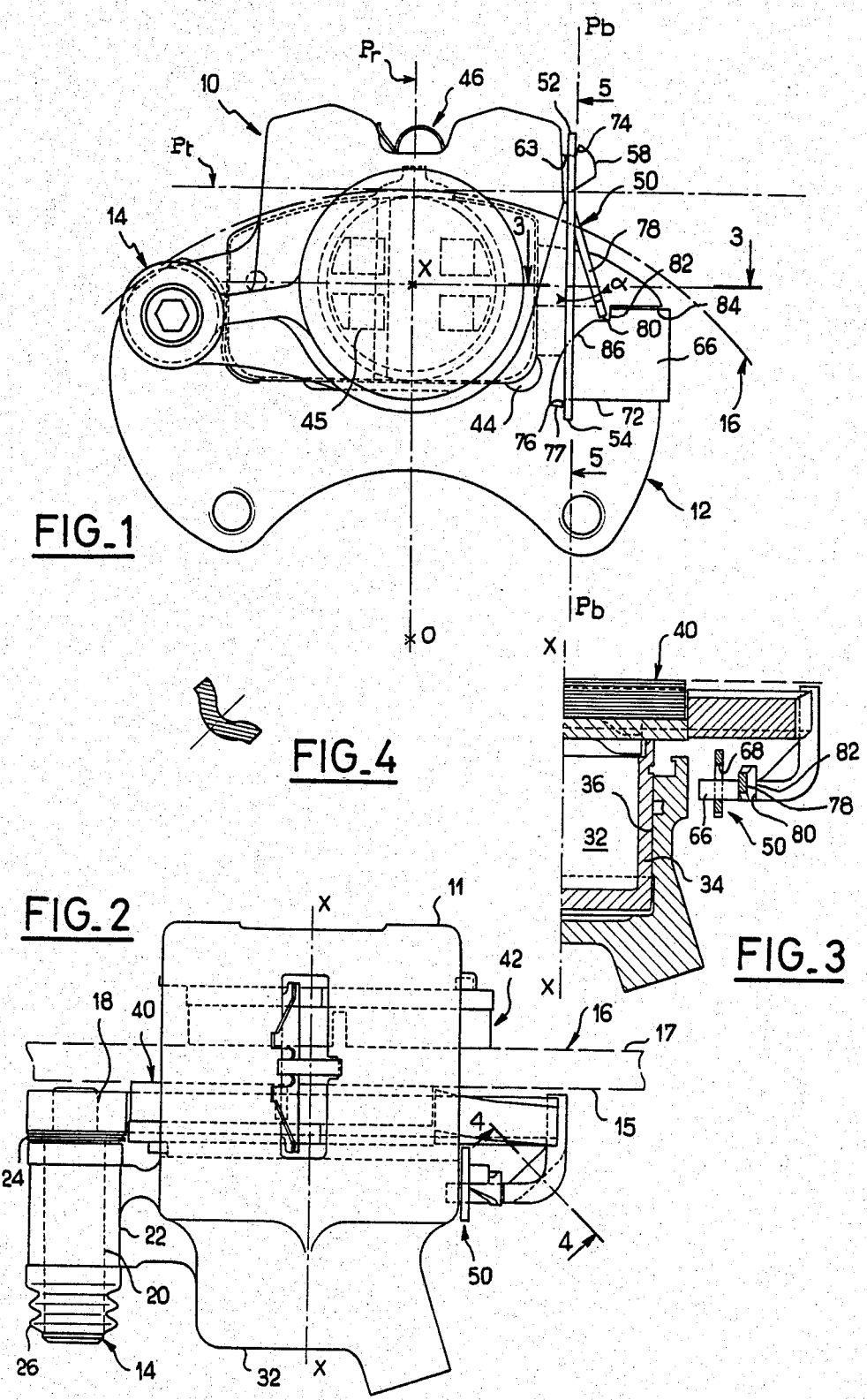

DISC BRAKE

This is a continuation of co-pending application Ser. No. 446,073 filed Dec. 1, 1982, now abandoned.

The subject of the present invention is a disc brake.

It relates, more particularly, to a disc brake of the type comprising a stirrup mounted to slide on a fixed support by means of a column extending parallel to the axis of the disc, fixed to the stirrup or the fixed support and received so as to slide in a corresponding bore in the fixed support or the stirrup, and a locking element associated with the stirrup and with the fixed support so as to co-operate in guiding the axial movements of the stirrup relative to the fixed support and to oppose its tilting about the axial column when it occupies its normal operating position.

European Patent Application No. 0,030,502 describes and illustrates a disc brake of the type mentioned above, in which the locking element consists of the interaction of two complementary axial sliding surfaces formed respectively on the stirrup and on the fixed support, which are kept in contact by means of a spring fixed to the stirrup and bearing on friction members. In this type of brake, the sliding surfaces are exposed to the weather and are subject to accumulations of impurities and to corrosion. European Patent Application No. 0,036,368 has already proposed overcoming this disadvantage by envisaging that said locking element consists of an elongate elastic element fixed to the fixed support or to the stirrup and retained elastically in a plane parallel to a plane tangent to the outer circumference of the stirrup and opposite a notched portion formed in the stirrup or in the fixed support. In the proposed solution, the elastic locking element consists of a metal wire of circular cross-section which interacts with plane surfaces formed on the stirrup and on the fixed support so as to ensure guidance of the relative movements of these two elements. Although the proposed solution improves the problems of corrosion, it does not eliminate them completely.

French Patent Application No. 2,422,863 describes and illustrates a disc brake in which the locking element has been eliminated. It will, of course, be understood that, in this way, all the problems of corrosion and relative friction occurring at the level of the locking element are obviously eliminated. However, to retain the stirrup in a correct position relative to the fixed support and to the rotating disc during the normal operation of the brake, the application proposes blocking means designed to oppose any tilting of the stirrup about the single axial column and which interact directly with the column. In the proposed solution, the blocking means comprise a torsion spring, one end of which is fixed to the stirrup and the other end of which is fixed to the axial column. To prevent any undesirable tilting movement of the stirrup, it is thought necessary to provide a torsion spring having a high characteristic. Moreover, when it is intended to replace the friction elements, that is to say when it is necessary to tilt the stirrup about the axial column, the torsion spring has to be removed. Since the latter is subjected to many thermal shocks during multiple actuations of the brake, one cannot be sure that its elastic characteristic will remain constant in course of time, and it will be understood that there is a risk of premature tilting of the stirrup about the column in the event that the blocking means formed by the spring no longer fulfil their function.

The object of the invention is to propose a disc brake which overcomes the disadvantages inherent in the two types of brake with an axial column which are mentioned above.

With this aim in view, the invention porposes a disc brake, characterized in that the locking element is a rod, a first end of which is articulated to the stirrup and the second end of which is articulated to the fixed support. According to another characteristic of the invention, the two ends of the rod are articulated to the stirrup and to the fixed support by means of joints which allow the rod to move in a plane perpendicular to the plane of the disc.

The locking element formed by the rod makes it possible to guide the movements of the stirrup relative to the fixed support, but also makes it possible to eliminate any sliding connection other than the main connection formed by the axial column. It will be appreciated that, as a result of such a structure of the locking element, all problems of corrosion and premature tilting of the stirrup are eliminated.

The invention will now be described in detail with reference to the attached drawings in which:

FIG. 1 is a side view of a disc brake produced according to the teachings of the present invention;

FIG. 2 is a top view of the disc brake of FIG. 1;

FIG. 3 is a partial view of the brake in a section along the line 3—3 of FIG. 1;

FIG. 4 is a view in a section along the line 4—4 of a detail of the disc brake of FIG. 2;

Figure 5:
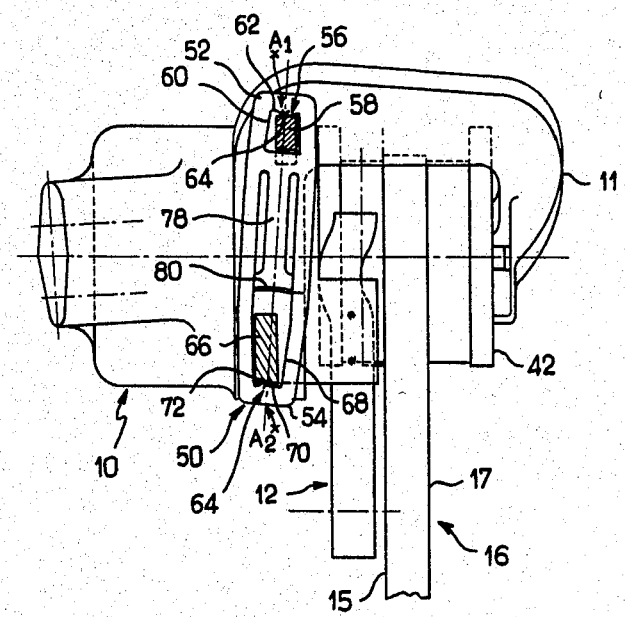
FIG. 5 is a view in a partial section along the line 5—5 of the disc brake of FIG. 1.

The disc brake shown in FIGS. 1 to 6 comprises a movable stirrup 10 mounted to slide on a fixed member or support 12. The stirrup 10 is mounted to slide on the fixed support by means of a column 14 extending parallel to the axis of rotation of the rotating disc 16. In the embodiment illustrated, and as shown more particularly in FIG. 2, the axial column 14 is fixed to the fixed support 12 by a threaded connection 18. The axial column 14 is received to slide in a cylindrical bore 20 made in one arm 22 or the stirrup 10. Protective rubber bellows 24 and 26 are provided on either side of the arm 22 to protect the sliding surface formed by the outer surface of the axial column 14. The disc brake also has a hydraulic brake motor comprising a cylindrical piston mounted to slide in a cylindrical bore 36 machined in the stirrup 10. The axis XX common to the piston 34 and to the cylindrical bore 36 is parallel to the axis of rotation 0 of the disc. The disc brake also possesses an inner friction element 40 capable of being stressed directly to engage frictionally with the inner face 15 of the rotating disc when the hydraulic brake motor 32 is actuated, and an outer friction element 42 fixed to the end portion or nose 11 of the stirrup. When the hydraulic brake motor 32 is actuated, the outer friction element 42 is stressed to engage frictionally with the outer face 17 of the rotating disc 16 as a result of a reaction via the sliding stirrup 10. The inner friction element 40 is received so as to be anchored and to slide in an aperture 44 in the fixed support 12. The outer friction element 42 is fixed to the nose 11 of the stirrup 10 by fixing and positioning means 45. The special structures of the inner and outer friction members 40 and 42 and their means of fixing in the disc brake will not be described in any more detail here, these characteristics being the subject of a first patent application in the name of the Applicant filed on the same day as the present application. The disc brake shown in the Figures also possesses a friction-element spring 46 of the type described in U.S. patent application Ser. No. 345,175 filed Feb. 3, 1982, now U.S. Pat. No. 4,463,837, which will not be described in any more detail here.

According to the invention, the disc brake has a locking element 50 associated with the stirrup 10 and with the fixed support 12 so as to co-operate in guiding the axial movements of the stirrup relative to the fixed support when the hydraulic brake motor 32 is actuated. The function of the locking element 50 is also to oppose the tilting of the stirrup 10 about the axial column 14 when it occupies the normal operating position.

According to a first characteristic of the invention, the locking element 50 consists of a rod, a first end 52 of which is articulated to the stirrup 10 and the second end 54 of which is articulated to the fixed support 12.

In the embodiment illustrated, the rod 50 is made of sheet-metal. The first end 52 is articulated to the stirrup 10 by means of a joint 56 which consists of a detent 58 made in one piece with the arch of the stirrup 10 and which penetrates into an aperture 60 made in the vicinity of the first end 52 of the rod 50. In the embodiment illustrated, the aperture 60 is cut out from the sheet-metal rod. The upper side edge 62 of the aperture 60 has a convex rounded profile so as to define a rounded stop surface which interacts and bears on a bearing surface 63 consisting of the upper face of the detent 58.

In a similar way, the second end 54 of the rod 50 is articulated to the fixed support 12 by means of a joint 64. The joint 64 consists of an arm 66 extending from the fixed support 12 and penetrating into an aperture 68 made in the vicinity of the second end 54 of the rod 50. In the embodiment illustrated, the aperture 68 is cut out from the sheet-metal rod 50. The lower transverse edge 70 of the aperture 68 has a convex rounded profile so as to define a rounded stop surface which interacts and bears on a corresponding bearing surface formed on the fixed support 12. This second bearing surface 72 consists of the lower face of the arm 66.

As may be noted especially in FIG. 1, when the stirrup 10 occupies its normal operating position, the rod 50 extends in a plane Pb perpendicular to the plane of the rotating disc 16 and parallel to a radial plane Pr passing through the axis 0 of the disc and through the axis XX of the brake motor 32. The upper face 63 of the detent 58 and the lower face 72 of the arm 66 are parallel to a plane Pt tangent to the outer circumference of the disc, the plane Pt itself being perpendicular to said radial plane Pr. It will therefore be understood that, as a result of the joints 56 nd 64, the rod 50 is capable of moving in the plane Pb about the articulation points $A_1$ and $A_2$ consisting of the points of contact between the rounded surface 62 and the upper face 63 of the detent 58 and the rounded surface 70 and the lower face 72 of the arm 66 respectively. When the hydraulic brake motor is actuated, the sliding stirrup 10 moves parallel to the axis of the disc 0 to cause the frictional engagement of the two friction members 40 and 42 with the rotating disc 16. This sliding movement is permitted by the axial column 14. The locking element consisting of the rod 50 co-operates in guiding the stirrup during sliding, by pivoting in the plane Pb about the joints 56 and 64. Since the axes of the joints 56 and 64 are perpendicular to the radial plane Pr, the movement of the rod in the plane Pb does not introduce any undesirable force capable of influencing the quality of sliding of the stirrup 10 relative to the fixed support 12.

In the embodiment of the invention illustrated in the Figures, the rounded stop surfaces 62 and 70 are kept in contact with the corresponding bearing surfaces 64 and 72 by the spring 46 which stresses the stirrup 10 apart from the fixed support 12 and which tends to cause the latter to tilt about the axis of the axial column 14. Consequently, the double function of the rod 50 is, on the one hand, to co-operate in guiding the stirrup 10 and, on the other hand, to oppose the tilting of the latter about the axial column 14 under the force applied by the spring 46.

To prevent the rod 50 from escaping accidentally, the detent 58 is provided with an upper edge 74 extending upwards parallel to the plane Pb so as to interact with the upper end 52 of the rod 50 and maintain the latter in position on the detent 58. In the same way, the lower face 72 of the arm 66 is provided with an edge 76 extending downwards from the upper face parallel to the plane Pb.

Additional safety means are provided to prevent the rod 50 from escaping accidentally. These means consist of a blade 78 made in one piece with the rod 50. The blade 78 forms an acute angle with the plane Pb of the rod 50. The free end 80 of the blade 78 interacts with a stop surface 82 formed on the arm 66. The stop surface 82 consists of a right-angled clearance formed on the upper face 84 of the arm 66. When the end 80 of the blade 78 is opposite the stop surface 82, and as may be noted especially in FIG. 1, it is impossible to disengage the arm 66 from the aperture 68 cut out from the second end 54 of the rod 50, and consequently for that very reason it is impossible to tilt the stirrup about the column 14 counter to the force exerted by the spring 46.

Figure 6:
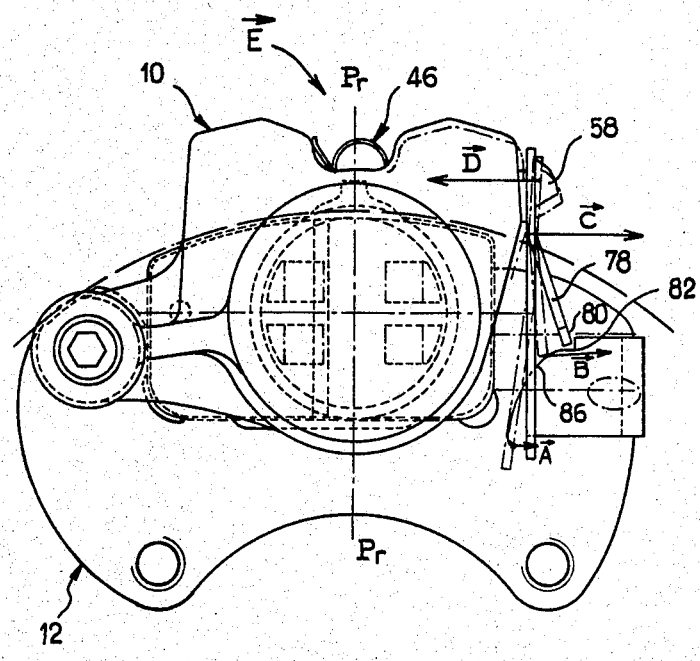
FIG. 6 is a view similar to that of FIG. 1, illustrating the various positions occupied by the stirrup and the locking element when the stirrup is put in place on the fixed support.

The stages of assembly of the brake will now be described with reference to FIG. 6.

When an operator wishes to assemble the brake, after threading the stirrup onto the axial column 14 he introduces the detent 58 into the aperature 60 made in the vicinity of the first end 52 of the rod 50. He then tilts the stirrup 10 about the column 14 in the direction indicated by the arrow E. During this tilting, the second end 54 of the rod 50 and the end 80 of the safety blade 78 bear on a sloping surface 86 formed at the end of the arm 66. The slope 86 causes the ends 54 and 80 to move in the direction of the plane Pr. At that moment, the rod and the stirrup 10 occupy the position shown by dot-and-dash lines in FIG. 6. In this position and as soon as the rounded stop surface 70 has gone beyond the end 77 of the edge 76 of the arm 66, under the elastic force resulting from deformation of the blade, the end 54 and the end 80 move in the directions indicated by the arrows A and B until they occupy their normal operating positions shown by unbroken lines. During this same movement, the end 52 and the central part of the rod 50 move in the directions indicated by the arrows D and C. The operator then has only to release the force applied in the direction E on the stirrup 10 counter to the spring 46 to cause the rod 50 to be locked into position. It will be understood that this results in a means for the automatic locking of the stirrup 10 in position relative to the fixed support 12 as a result of simple tilting of said stirrup about the column 14.

I claim:

1. A disc brake, comprising a stirrup including a hydraulic brake motor for displacing a friction member to engage frictionally with the rotating disc, the stirrup mounted to slide axially on a fixed support by means of a column extending parallel to the axis of the disc, the column fixed to one of the stirrup and fixed support and slidably received in a corresponding bore in one of the fixed support and stirrup, and locking element associated with the stirrup and fixed support to cooperate in guiding the axial movements of the stirrup relative to the fixed support and to oppose rotational movement of the stirrup about said column when the stirrup is in an operating position so that the hydraulic motor can displace the friction member into frictional engagement with the rotating disc, characterized in that said locking element comprises a releasable, self-locking rod having a pair of oppositely disposed ends providing articulated connections with said stirrup and fixed support by means of joints allowing said rod to move in a plane perpendicular to the plane of the rotating disc, the axes of said joints being perpendicular to a radial plane passing through the axis of the disc and through the axis of said brake motor, a first one of said ends pivotably connected with the stirrup about one of said axes and a second one of said ends pivotably connected with said fixed support about another of said axes, and means for locking the rod when the stirrup is in said operating position by effecting securement of the rod to the stirrup and fixed support, the rod positioned in a plane parallel to a radial plane passing through the axis of the disc in order to prevent said rotational movement of the stirrup, the locking means comprising a blade member integral with said rod and extending from the rod to form an acute angle with the plane of the rod, a free end of said blade member bearing on a stop surface formed on an arm of the fixed support which also is received within an aperture in said second one of said ends, the blade member resiliently deformable to disengage the free end from said stop member and permit release of said rod from said stirrup and fixed support, and the blade resiliently deformable to permit mounting of the rod relative to the stirrup and fixed support so that the blade member freely returns to said angle to engage the stop surface of the fixed support and thereby self-lock the rod into said securement with the stirrup and fixed support when the stirrup is in operating position.

2. The disc brake in accordance with claim 1, wherein at least one of said joints consists of a rounded stop surface formed at one of said ends of the rod and bears on a corresponding bearing surface formed on one of the stirrup and fixed support.

3. The disc brake in accordance with claim 1, wherein said rod comprises a planer metal sheet with a first aperture in the first end and a rounded stop surface comprising a transverse edge of said first aperture, and the aperture formed in the second end having a second rounded stop surface comprising a transverse edge thereof.

* * * * *